(12) United States Patent
Franca-Neto et al.

(10) Patent No.: US 9,438,576 B2
(45) Date of Patent: Sep. 6, 2016

(54) APPARATUS AND METHOD FOR VALIDATION AND AUTHORIZATION OF DEVICE AND USER BY GLOBAL POSITIONING AND NON-PROMPTED EXCHANGE OF INFORMATION

(71) Applicants: Luiz M Franca-Neto, Sunnyvale, CA (US); Marta A G da Franca, Sunnyvale, CA (US)

(72) Inventors: Luiz M Franca-Neto, Sunnyvale, CA (US); Marta A G da Franca, Sunnyvale, CA (US)

( * ) Notice: Subject to any disclaimer, the term of this patent is extended or adjusted under 35 U.S.C. 154(b) by 0 days.

(21) Appl. No.: 13/915,627

(22) Filed: Jun. 12, 2013

(65) Prior Publication Data

US 2014/0373114 A1 Dec. 18, 2014

(51) Int. Cl.
*H04L 29/00* (2006.01)
*H04L 29/06* (2006.01)
*G06Q 20/32* (2012.01)
*G06Q 20/40* (2012.01)
*H04W 12/12* (2009.01)

(52) U.S. Cl.
CPC .......... *H04L 63/08* (2013.01); *G06Q 20/3224* (2013.01); *G06Q 20/4016* (2013.01); *H04L 63/083* (2013.01); *H04L 63/107* (2013.01); *H04L 63/1425* (2013.01); *H04L 2463/102* (2013.01); *H04W 12/12* (2013.01)

(58) Field of Classification Search
CPC ................ H04L 63/08; H04L 63/107; H04L 2463/102; H04L 63/083; H04L 63/1425; H04W 12/12; G06Q 20/3224; G06Q 20/4016
See application file for complete search history.

(56) References Cited

U.S. PATENT DOCUMENTS

| | | | |
|---|---|---|---|
| 8,145,561 B1 * | 3/2012 | Zhu | 705/38 |
| 8,447,273 B1 * | 5/2013 | Friedlander | H04M 1/72577 382/115 |
| 2002/0038818 A1 * | 4/2002 | Zingher | G06K 9/00597 235/381 |
| 2003/0141372 A1 * | 7/2003 | Brown | G07F 19/207 235/487 |
| 2005/0286686 A1 * | 12/2005 | Krstulich | 379/32.01 |
| 2006/0085177 A1 * | 4/2006 | Toyama et al. | 703/22 |
| 2006/0156209 A1 * | 7/2006 | Matsuura | G06Q 10/10 714/798 |
| 2007/0010248 A1 * | 1/2007 | Dravida et al. | 455/435.1 |
| 2007/0107053 A1 * | 5/2007 | Shraim et al. | 726/22 |
| 2007/0250920 A1 * | 10/2007 | Lindsay | 726/7 |
| 2008/0094230 A1 * | 4/2008 | Mock et al. | 340/573.4 |
| 2008/0208748 A1 * | 8/2008 | Ozment et al. | 705/44 |
| 2009/0125321 A1 * | 5/2009 | Charlebois | G06Q 30/02 705/346 |
| 2009/0201149 A1 * | 8/2009 | Kaji | G01S 5/0294 340/539.13 |
| 2010/0070456 A1 * | 3/2010 | Sugihara | G06N 5/02 706/54 |
| 2010/0192209 A1 * | 7/2010 | Steeves et al. | 726/7 |
| 2010/0250727 A1 * | 9/2010 | King et al. | 709/224 |
| 2011/0046920 A1 * | 2/2011 | Amis | 702/181 |
| 2011/0081634 A1 * | 4/2011 | Kurata et al. | 434/236 |
| 2011/0175810 A1 * | 7/2011 | Markovic et al. | 345/158 |
| 2011/0202466 A1 * | 8/2011 | Carter | 705/67 |
| 2011/0289597 A1 * | 11/2011 | Hinds et al. | 726/28 |
| 2012/0054057 A1 * | 3/2012 | O'Connell et al. | 705/26.1 |
| 2012/0198570 A1 * | 8/2012 | Joa | G06F 21/30 726/30 |
| 2013/0101140 A1 * | 4/2013 | Cho et al. | 381/109 |
| 2013/0110715 A1 * | 5/2013 | Buchhop | 705/42 |
| 2013/0303184 A1 * | 11/2013 | Yang et al. | 455/456.1 |
| 2014/0279503 A1 * | 9/2014 | Bertanzetti et al. | 705/44 |

\* cited by examiner

*Primary Examiner* — Michael Pyzocha

(57) ABSTRACT

An authorization and validation system and method for mobile financial transactions uses (1) historic Global Positioning System (GPS) and time at specific locations and (2) both visible and invisible prompts to allow access to assets and performance of financial transactions. Said system and method also determines when the mobile device, tablet or smart phone, is lost or is operated by an impersonator. Special attention is devoted when said system is engaged in determining whether the user is under threat or not.

14 Claims, 8 Drawing Sheets

Other Services of Interest for both
Financial Institution and User

Knowledge of locations and time allows server to:
1) suggest points of interest close to user trajectory
2) coordinate with stores close to trajectory for discounted offers
3) suggest destinations of interest
4) coordinate with airlines, hotels, and restaurants at destinations of
likely interest for user Knowledge of locations and time where ATM where used
1) allows server to suggest or recommend ATM to use or avoid for safety
reasons
2) recommend other ATM closer to user trajectory

Fig. 7

APPARATUS AND METHOD FOR VALIDATION AND AUTHORIZATION OF DEVICE AND USER BY GLOBAL POSITIONING AND NON-PROMPTED EXCHANGE OF INFORMATION

BACKGROUND OF THE INVENTION

1. Field of the Invention

This patent application is related to a provisional application No. 61/657,897, "Validation and Authorization of Device and User by Global Positioning and Non-Prompted Exchange of Information", submitted to the US PTO on Jun. 11, 2012, by the authors of this current patent application.

The invention relates generally to validation and authorization of both device and user to access protected content, and more particularly to security of financial transactions on handheld or mobile phones. It also relates to anti-robbery action by Police and Banks, and protection of citizens and clients.

2. Background

In financial transactions, it is important to safely validate and authorize both the device and the user himself/herself before having him/her accessing protected data and/or executing financial transactions.

The miniaturization progress in microelectronics led to progressive more computing power on desktops and more recently handheld, tablets and mobile smart phones capable of complex data processing. Tablets and, more pervasively, smart phones are now considered as a means to access and execute electronic financial transactions. In the use of tablets or cell phones as electronic wallets, both the device and the user might be exposed to criminal action. The device could have been stolen and be used by someone impersonating its owner. The user might be victim of an assault where the assailant is forcing him to access his accounts and perform financial operations under threat of violence.

In the interest of clarity in the descriptions, tablets and smart phones or any other mobile device used in financial, banking or payment transactions will be referred to indistinguishably as the mobile device throughout this document.

Therefore there is a need to protect against the mobile device being used by an impersonator to access protected data of the legitimate user of said mobile device.

And, there is also a need for anti-kidnapping and protective action for citizens and user of said mobile device against kidnapping or threat of violence. In particular protection against violence or threat of violence intended to force the user to give access to his protected financial assets using his/her mobile device.

The initial thoughts that developed into this invention came to Luiz M Franca-Neto when he was serving as a professor at the University of São Paulo, Brazil, in the first semester of 2010. Luiz was traveling frequently between California and São Paulo state in Brazil. He had met Mr. Milton Mitoo Yamaguchi, Director at Itautec in Brazil, a company specialized in computers and automatic teller machines for banks Mr. Yamaguchi mentioned Itautec's concerns about violence against bank automatic machines and Itautec's interest in solutions for improving safety of bank assets. During that period, in one of the returns to California, Luiz mentioned the needs of Itautec in Brazil to Marta. Both Luiz and Marta then addressed the concern for bank assets' and user's safety. Both Luiz and Marta conceived the original ideas and innovations claimed in this provisional patent in that first semester of 2010.

SUMMARY OF THE INVENTION

The invention relates to protection of citizens, clients and assets in financial transactions using mobile devices. Authorization and validation of both mobile device and user (1) uses historical Global Positioning System (GPS) information from the mobile device from which the device and its user geographic signature is generated, and (2) uses interactive exchange of information between said user/mobile device and an authorization & validation center using transmission of information which may not be visibly prompted to the user, may not be shown on the mobile device's screen, or may be disguised as benign questions posed to the mobile device user. Confirmation of user identity or information on the user's safety status, whether he/she is under threat for instance, is communicated by the user responding or not responding to pre-programmed questions and answers in non visible prompts, or is communicated by how the user holds the mobile device or choose to touch or not parts of the touch screen, change or not change the volume, or provide additional information not prompted at the screen by means of one or several of the electronic sensors available in said mobile device.

For a fuller understanding of the nature and advantages of the present invention, reference should be made clear by the following description together with the accompanying figures. The related and complementary details of the invention for aspects (1) and (2) listed above will be described together in this provisional application. Examples of claims to this invention in its aspects (1) and (2) are stated at the end of this document.

BRIEF DESCRIPTION OF THE DRAWINGS

FIG. 7 shows examples of other services that can be provided by the bank or financial institution while providing Authorization/Validation services and protection of client and assets according to this invention.

DETAILED DESCRIPTION OF THE INVENTION

Tablets and cell phones in particular tend to be carried by their users wherever they go. Thus, the history of geographical locations visited and their times of visit can be used to construct a signature for both the mobile device and, by proxy, its user.

Figure 1:
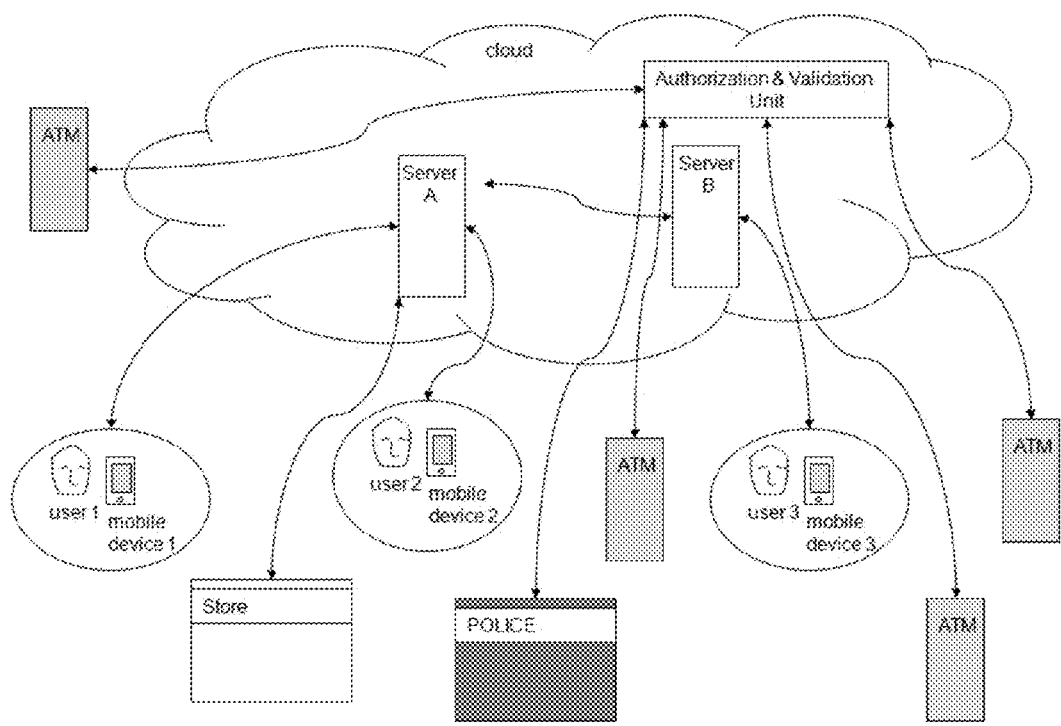
FIG. 1 shows the typical elements in a network for authorization and validation of users' access with a mobile device in an embodiment according to the current invention

As shown in FIG. 1, in an embodiment of the invention disclosed in this provisional patent application, tablet or smart phones connect to a cloud of servers set up by or in the interest of a Financial Institution where users of tablets or smart phones have accounts.

Historical data from Global Positioning System (GPS) sensor inside the tablet or smart phone of each user is accumulated in the device itself and is also periodically uploaded to a server in the cloud. This historical information of locations and time where the user was at those locations is used to construct a "signature" for each user. This signature together with standard member ID and passwords are used by a financial institution for validation and authorization of clients and to allow those clients to access their accounts and perform financial transactions. These signatures can also guide the fielding of benign questions prompted at the user screen at both pre-emptive moments and upon user request for access as will be further described below. These signatures are also used to estimate the likelihood of each upload of new GPS and time data be originated from the legitimate user who had his previous historical GPS and time data recorded with the financial institution. This degree of likelihood in addition to other direct queries to the user establishes his/her identity.

Note also in FIG. 1 the link between the cloud server and authorization & validation unit to the police service. This link is to be agreed with the user. Police work is to be engaged solely in the cases where the user/client's safety is under threat, and police action must only be launched without jeopardizing the user safety.

Note further as shown in FIG. 1 that stores can access the servers and be the recipient of payments by the mobile users.

The service provided by the cloud is desired to run 24 hours, 7 days a week and accept upload from users wherever they are. The frequency of uploading may vary from user to user, and might also be pre-programmed to depend on how fast mobile users change their location. As mentioned above, both geographical positions and time series when the user was at a position is recorded.

Because tablet and smart phones have GPS sensors and also a variety of other sensors, the device is able to know its acceleration and weather the user is holding the device to read its touch screen monitor in picture or landscape position. Other inputs to the device under the control of the user as volume change and display intensity changes for instance can be used to convey information back to the server. All this additional information can be used to communicate to the servers in the cloud not only that the actual user and not an impersonator is operating the tablet or smart phone, but the same sensors can be used to communicate with the cloud whether the user is under threat or not. And, in this latter case, very importantly, all the communication can be conducted unbeknownst to the person threatening the user.

This personal protection is important since progressively more financial transactions are performed with mobile devices and there might be non-negligible chance for the user to have been kidnapped or otherwise been held hostage by an aggressor intent on forcing him/her to withdraw cash or transfer assets electronically against his/her will. In all these cases, it is important to the user safety that the exchange of information that allow the cloud server to determine the user to be under threat be conducted invisibly to his/her aggressor. And the consequent coordinated action by the financial institution and potentially by the police as well to come to the rescue of the endangered user need to be executed without exposing the user to any additional unduly danger.

It's also important to for the server to be able to pre-emptively inquiry the user in case his/her location unexpectedly appear to be dramatically different from his typical trajectories at the same time. These inquiries might occur well in advance of any attempt to access financial assets and therefore has more opportunities for the questioning and exchange of responses between financial institution and user to be disguised as unrelated to financial transactions and be safely invisible to a possible aggressor or kidnapper of the user.

It should be understood that all this layer of security and protection for client and assets needs to be agreed by the user as subscriber to these services.

Figure 2:
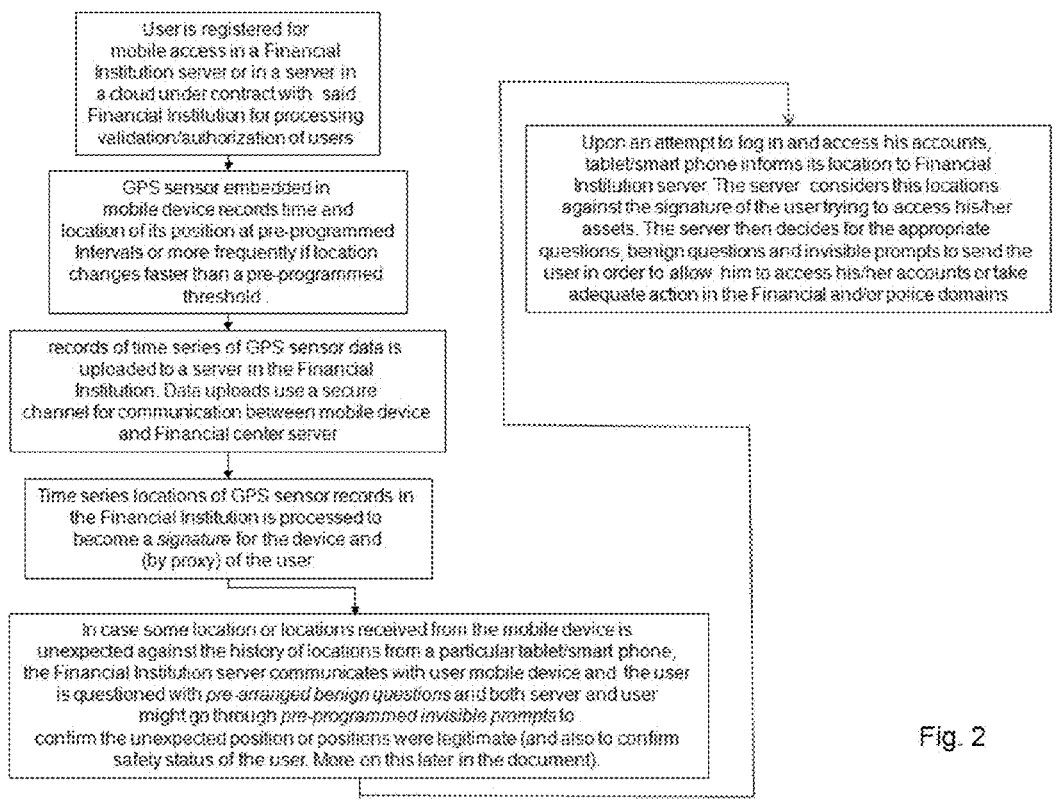
FIG. 2 shows the flow of information in the process of accumulating device/user GPS time series of locations, construction of user signature and decision for the appropriate questions, benign questions and invisible prompts to send to the user

FIG. 2 describes the process and flow of information between the tablet or smart phone and the financial institution's cloud to allow the latter to construct a "signature" for the user. All the communication and exchange of information between the tablet/smart phone and server with or without user interference or responses should be pre-programmed and the user should have explicitly agreed to this gathering of information. Information from the GPS sensor in the user's tablet or smart phone is accumulated and periodically uploaded to the financial institution servers in the cloud, referred to here as the cloud. In the cloud, a signature for each user based on his GPS location and time data is created. This signature is progressively updated at each upload of newer GPS locations and times by the tablet/smart phone. At an update of the signature, if the new GPS and time data is unexpected beyond a pre-programmed threshold, the servers can pre-emptively launch benign pre-programmed questions to confirm this new data is legitimate ahead of any attempt to access his/her account by the user. This pre-emptive questions can also be used as opportunity to determine the safety status of the user, as will be discussed later. Similarly, upon an attempt to access his accounts, GPS position and time information at the moment of that attempt is sent to financial institution and compared with user said signature. Depending on the results of this comparison, adequate questioning to confirm user is who he/she says he/she is and to confirm his/her safety status is launched.

Figure 3:
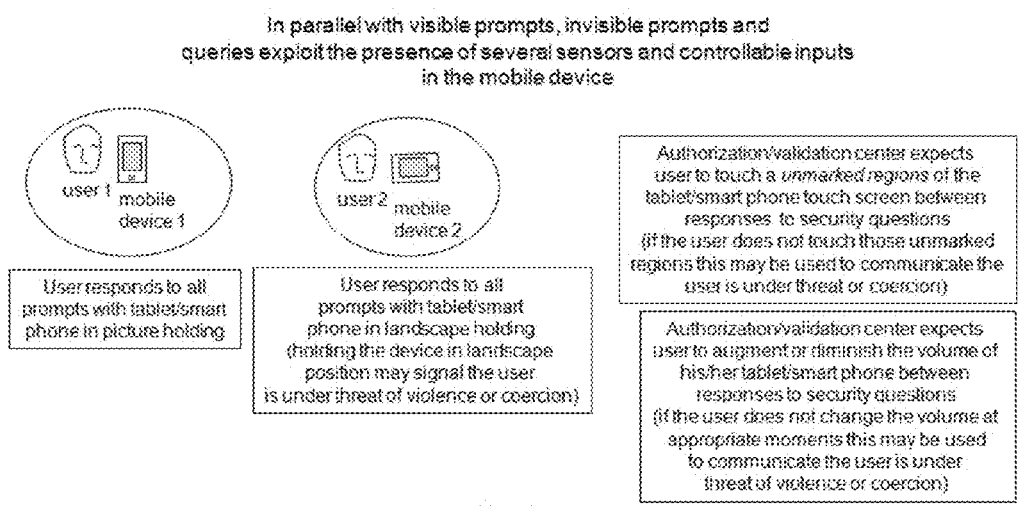
FIG. 3 shows examples of invisible prompts and invisible responses or absence of responses from the user for confirming his/her identity or current status of personal safety

FIG. 3 shows a set of examples for the concept of invisible prompts advanced in this disclosure. These are only illustrative examples for the concept and the skilled in the art will recognize that many other examples could be constructed without departing from the spirit of this invention. All invisible prompts are known by the user and pre-programmed by him/her ahead of time. They are meant to be nuanced exchange of information between user and his/her financial institution's in manners that would be invisible to an impostor or someone threatening the user with violence. This strategy exploits the variety of sensors embedded in tablets and smart phones. This strategy also exploits the input to controls unrelated to financial transactions, like volume of play back in a mobile device, for instance. In one example, the user pre-programmed that all his responses with the tablet or smart phone held with screen in picture position are responses with no concern for safety. On the contrary, responses with the mobile device held with screen in landscape position is mean to communicate to the financial institution that his responses are being sent with concern for his safety and or are responses he/she is being coerced to send. All responses that carry information of safety concerns need to be confirmed with further exchange between financial institution and client, since the mobile might have been held with screen in landscape position by accident in this example. In order to distinguish accidental from intentional cases, some examples of additional questions with other examples of invisible prompts are offered in FIG. 3. In one example, between questions, the user is expected to touch a pre-determined by unmarked area of the touch screen of his/her tablet or smart phone. In another, example, he/she must change the volume between responses. All these actions will have meaning invisible to an attacker holding the user hostage and under threat of violence during the user's access to his/her accounts. It's also interesting to point that the invisible prompts in several cases are more effective in communicating safety concerns by the absence rather than the presence of inputs. For instance, it might have been better if the user pre-programmed his/her need to touch unmarked parts of the touch screen or change the volume of his mobile device when he is safe. The absence of these special inputs under threat is more desirable since the attacker will not have chance to observe any special action by the user to communicate his/her dangerous circumstances. And these absences can be part of an exchange of messages between user and financial institution during confirmation of the status of the user being unsafe.

Figure 4:
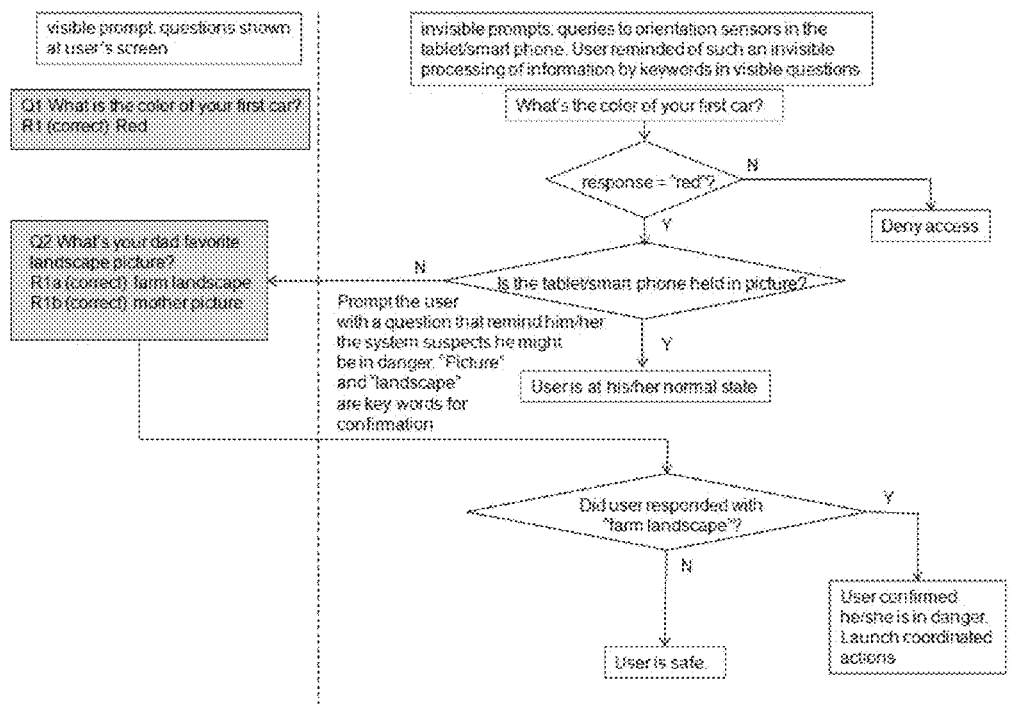
FIG. 4 shows examples a flow of visible and invisible prompts of pre-configured typical confirmation questions and benign questions (with invisible prompts) through which confirmation of identification and/or personal safety of the user is communicated to a validation/authorization system
Figure 5A:
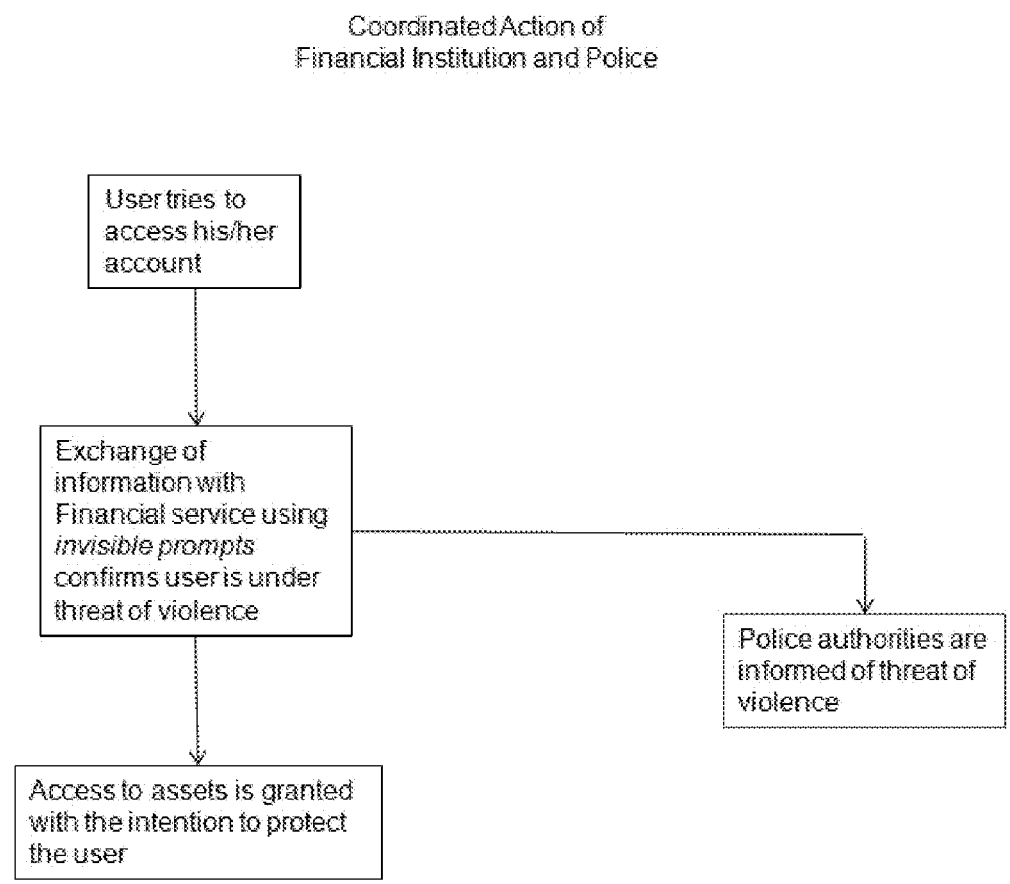
FIG. 5a shows an example of coordinated action by the validation/authorization system and anti-fraud forces in the financial institution and police force upon personal safety prompts confirm the user is under threat of violence.

FIG. 4 shows an example of a flow graph of information exchange between financial institution's servers and examples of invisible prompts running in parallel for a case where the user is attempting to access his/her account. The skilled in the art will recognize other flows can be designed without departing from the spirit of the invention. In the case of FIG. 4, a question reminding the user the holding the mobile device in portrait or landscape is being monitored shows in the screen in disguised benign presentation in order not to alert the possible aggressor of the user. Once it's confirmed the user is under threat, coordinated actions with police might be launched. FIG. 5a summarizes this flow of information. Note that access to assets is still granted to protect the user, while the Police authorities are alerted.

Figure 5B:
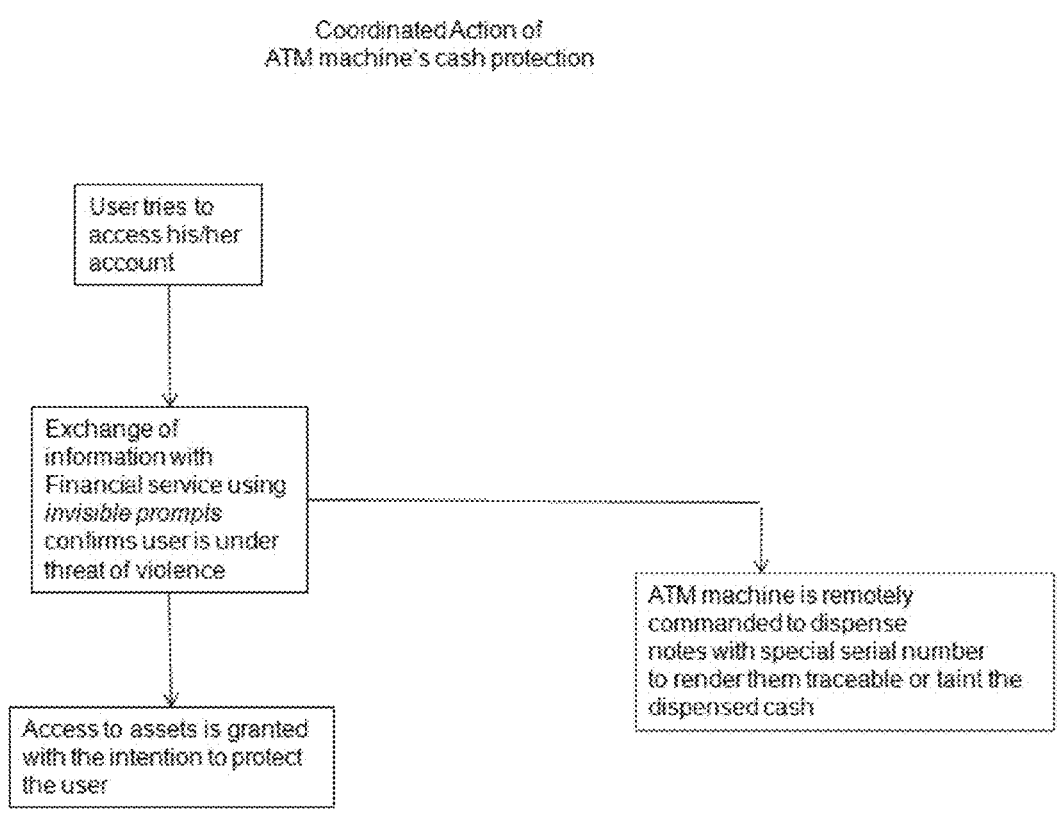
FIG. 5b shows an example of anti-robbery action launched at an Automatic Teller Machine (ATM) in consequence of confirmation the user is under threat of violence: dispense special serial number notes or taint the dispensed cash.

Sometimes it's possible that the user is under threat to access his/her accounts at automatic teller machines (ATM) and dispense cash to his/her assailant. In such a circumstance, as shown in FIG. 5b, it's possible that another kind of coordinated action from the financial institution be used, and in this case, as an example, the ATM machine is set to dispense specially numbered notes or purposefully set to taint the notes with human-unnoticeable chemicals that can be later easily recognized by electronic readers.

Figure 6:
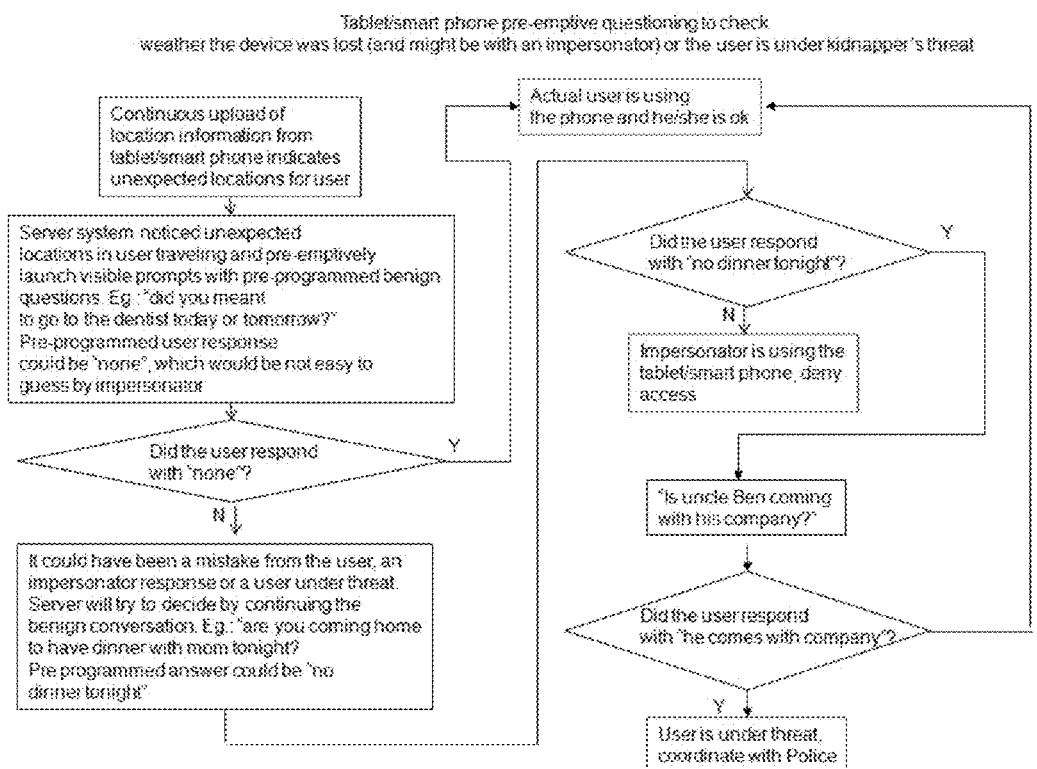
FIG. 6 shows an example of tablet/smart phone in pre-emptive questioning. Pre-emptive questions are prompted by an upload of location information by the mobile device that contrasts sharply with the user signature. These questions are therefore launched before any attempt to access financial data or operation. The flow of information exemplifies a path to determine device and user status.

FIG. 6 illustrates an example of a combination of two concepts advanced in this invention. Invisible prompts and pre-emptive interaction between financial institution and user happens when no attempt to access the user account was made yet. In this pre-emptive interaction there is more opportunity to exchange information about personal safety of the mobile user in the very discrete and invisible (to the potential assailant) way. Note in the illustrated example of FIG. 6 that the questions are unrelated to financial transactions and the skilled in the art will recognize there can be many other constructions to these questions and responses to effect the same result of informing the user's safety status without departing from the spirit of this invention. All questions are pre-programmed Confirmation using follow up questions are designed to make sure the user in fact meant to inform he/she is under threat. Expected responses are by design very different from what an impersonator would be inclined to send back to the financial institution. Correct responses are crafted to resemble natural language and be unrecognizable by an assailant as information about his/her victim safety status.

This invention disclosure brings client's location information into the banking operations, validation and authorization procedures. This allows the financial institutions to pro-actively search for useful new services to their clients. They don't need to infer their clients' interests only from purchases but can now infer interest or suggest deals from places, products and stores their clients might drive, walk or just pass by without noticing. FIG. 7 lists some of those possible new and useful services financial institutions can provide their clients with support from the invention in this disclosure.

We claim:

1. A mobile assistance system comprising a smartphone or a handheld device, hereforth referred to as mobile device, where
said mobile device is equipped with means to determine its geographical location, where by accumulating historical data on its geographical location for a period, said mobile device constructs a list of geographical positions or geographical regions its user is likely to be found at specific times of a day, a week, a month or a year; where
said list of geographical positions or geographical regions and time thus developed represents an identifying trajectory pattern for the user, hence considered the user's signature; and
the mobile device assigns probabilities for said user to be in a safe state as a function of how much the user's recent and current geographical trajectory of locations and times depart from said user's signature, said mobile device further being itself part of a financial or a banking system, where upon determination of user to be a fraudulent impersonator or determination of user to be unsafe or threatened by said mobile device, said financial or banking system limits access to requested media or asset, and said financial or banking system dispenses marked or tainted notes when cash is requested by said impersonator of user or threatened or unsafe user.

2. The mobile assistance system of claim 1, where the mobile device detects when its user's geographical and time trajectory departures from the user's signature is larger than a threshold and launches in-promptu communications with said user in consequence.

3. The mobile assistance system of claim 2, where in-promptu communications between the mobile and said user include questions from the mobile device to determine its user identity and whether said user is in a safe environment; where said questions uses geographical information collected in said list to determine user identity and include questions related to locations with which the mobile device learned the user is familiar, or relates to habits of the user the mobile device learned; where answers from said user on his habits carry information on said user's safety state.

4. The mobile assistance system of claim 2, where mobile device has a touchscreen, has means to determine its orientation and has inputs related to volume control, where questions from the mobile device are responded by the user with actions which are noticeable, as passwords inputs, or voice responses for instance, and with actions by the user which are not noticeable, as changes in mobile device orientation, or touches at unmarked parts of the touchscreen by the user, or changes in volume control; where responses by said user by means of said non noticeable actions carry information on said user's safety state.

5. The mobile assistance system of claim 4, where non-noticeable inputs are analyzed by either the presence or absence of said inputs on the touch screen, as by said user pressing or not pressing a blank portion of the touchscreen, or an area of the touchscreen with no icon or button, or by said user changing the orientation of the touchscreen; said non noticeable inputs used to determine whether the user is under unsafe circumstances.

6. The mobile assistance system of claim 1, where communication between mobile device and user is launched at the time the user requests access to a bank account, media or asset; where communications between the mobile and said user include questions from the mobile device to determine its user identity and whether said user is in a safe environment; where said questions uses geographical information collected in said list to determine user identity and include questions related to locations with which the mobile device learned the user is familiar, or relates to habits of the user the mobile device learned; where answers from said user on his habits carry information on said user's safety state.

7. The mobile assistance system of claim 6, where mobile device has a touchscreen, has means to determine its orientation and has inputs related to volume control, where questions from the mobile device are responded by the user with actions which are noticeable, as passwords inputs, or voice responses for instance, and with actions by the user which are not noticeable, as changes in mobile device orientation, or touches at unmarked parts of the touchscreen by the user, or changes in volume control; where responses by said user by means of said non noticeable actions carry information on said user's safety state.

8. The mobile assistance system of claim 7, where non noticeable inputs are analyzed by either the presence or absence of said inputs on the touch screen, as by said user pressing or not pressing a blank portion of the touchscreen, or an area of the touchscreen with no icon or button, or by said user changing the orientation of the touchscreen; said non noticeable inputs used to determine whether the user is under unsafe circumstances.

9. The mobile assistance system of claim 8, where information on the unsafe status of the user is communicated to the proper Police authorities.

10. A validation and authorization method comprising: using a smartphone or a handheld device, hereforth referred to as mobile device, where said mobile device is equipped with means to determine its geographical location; accumulating said mobile device historical data on its geographical location for a period;
constructing a list of geographical positions or geographical regions its user is likely to be found at specific times of a day, a week, a month or a year; where said list of geographical positions or geographical regions and time thus developed represent an identifying trajectory pattern for the user, hence considered the user's signature; the mobile device assigning probabilities for said user to be in a safe state as a function of how much the user's recent and current geographical trajectory of locations and times depart from said user's signature, said validation and authorization method further comprising: using a financial or a banking system to access media, asset and cash where said mobile device is a part;
limiting access to said media and asset if user of said smartphone is determined to be an impersonator or to be under unsafe or threatened condition; dispensing specially marked or tainted cash when cash is requested upon said determination the user to be an impersonator or to be under unsafe or threatened condition.

11. The validation and authorization method of claim 10 further comprising: detecting when geographical and time trajectory of said user of said mobile device departures from the user's signature more than a threshold and launching in-promptu communications with said user in consequence.

12. The validation and authorization method of claim 11 further comprising: including questions from the mobile device to determine its user identity and whether said user is in a safe environment; where said questions uses geographical information collected in said list to determine user identity and include questions related to locations with which the mobile device learned the user is familiar, or relates to habits of the user the mobile device learned; where answers from said user on his habits carry information on said user's safety state.

13. The validation and authorization method of claim 11 further comprising: using noticeable user actions to prompted questions as passwords input or voice responses, and non noticeable user actions in response to questions as changing mobile device orientation or touching unmarked parts of the touchscreen, or changes in volume control, where those responses carry information on said user's safety state.

14. The validation and authorization method of claim 13 further comprising: analyzing non noticeable inputs by either the presence or absence of inputs on the touch screen, as by said user pressing or not pressing a blank portion of the touchscreen, or an area of the touchscreen with no icon or button, or by said user changing the orientation of the touchscreen to determine whether the user is under unsafe circumstances.

* * * * *